(12) United States Patent
Benoit et al.

(10) Patent No.: US 10,401,648 B2
(45) Date of Patent: Sep. 3, 2019

(54) OPHTHALMIC LENS AND METHOD FOR DETERMINING THE SAME

(71) Applicant: ESSILOR INTERNATIONAL, Charenton-le-Pont (FR)

(72) Inventors: Celine Benoit, Charenton-le-Pont (FR); Claire-Eline Bres, Charenton-le-Pont (FR); Damien Paille, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/559,235

(22) PCT Filed: Mar. 14, 2016

(86) PCT No.: PCT/EP2016/055437
§ 371 (c)(1),
(2) Date: Sep. 18, 2017

(87) PCT Pub. No.: WO2016/150742
PCT Pub. Date: Sep. 29, 2016

(65) Prior Publication Data
US 2018/0081196 A1  Mar. 22, 2018

(30) Foreign Application Priority Data
Mar. 20, 2015  (EP) .................... 15160197

(51) Int. Cl.
*G02C 7/06* (2006.01)
*G02C 7/02* (2006.01)
(52) U.S. Cl.
CPC ............. *G02C 7/025* (2013.01); *G02C 7/027* (2013.01); *G02C 7/066* (2013.01)
(58) Field of Classification Search
None
See application file for complete search history.

(56) References Cited

U.S. PATENT DOCUMENTS 4,796,988 A   1/1989  Dufour et al.
8,579,436 B2 * 11/2013  Calixte .................. G02C 7/025
                                                  351/159.01
(Continued)

FOREIGN PATENT DOCUMENTS

CN       201622402 U    11/2010
EP       2 369 403 A1    9/2011
(Continued)

OTHER PUBLICATIONS

International Search Report and Written Opinion dated Jun. 23, 2016 in PCT/EP2016/055437.
(Continued)

*Primary Examiner* — Darryl J Collins
(74) *Attorney, Agent, or Firm* — Oblon, McClelland, Maier & Neustadt, L.L.P.

(57) ABSTRACT

A computer implemented method for determining an ophthalmic lens for providing to a wearer a comfortable vision when looking at electronic displays. The method includes: a wearer near vision electronic display use determining to determine at least an electronic display the wearer intends to use in a near vision situation; a wearer intermediate vision electronic display use determining to determine at least an electronic display the wearer intends to use in an intermediate vision situation; an usage priority rank determining to determine an usage priority rank between the near vision electronic display during the wearer near vision electronic display use determining and the intermediate vision electronic display during the wearer intermediate vision electronic display use determining; an ophthalmic lens determining to determine an ophthalmic lens from the at least one near vision electronic display or the at least one intermediate vision electronic display and the usage priority rank.

17 Claims, 8 Drawing Sheets

(56) References Cited

U.S. PATENT DOCUMENTS

| | | | |
|---|---|---|---|
| 9,022,559 B2* | 5/2015 | Suzuki | G02C 7/024 351/159.24 |
| 2004/0027679 A1 | 2/2004 | Welk et al. | |
| 2009/0213325 A1 | 8/2009 | Katzman et al. | |
| 2011/0222019 A1 | 9/2011 | Suzuki et al. | |
| 2012/0016645 A1 | 1/2012 | Altheimer et al. | |
| 2012/0176583 A1 | 7/2012 | Calixte et al. | |

FOREIGN PATENT DOCUMENTS

| | | |
|---|---|---|
| FR | 2 587 505 A1 | 3/1987 |
| WO | WO 2010/133813 A1 | 11/2010 |

OTHER PUBLICATIONS

Dan Katzman, et al. "Fig. 2C US20090213325", European Patent Register, XP055280642, 2009, pp. 1-7.

* cited by examiner

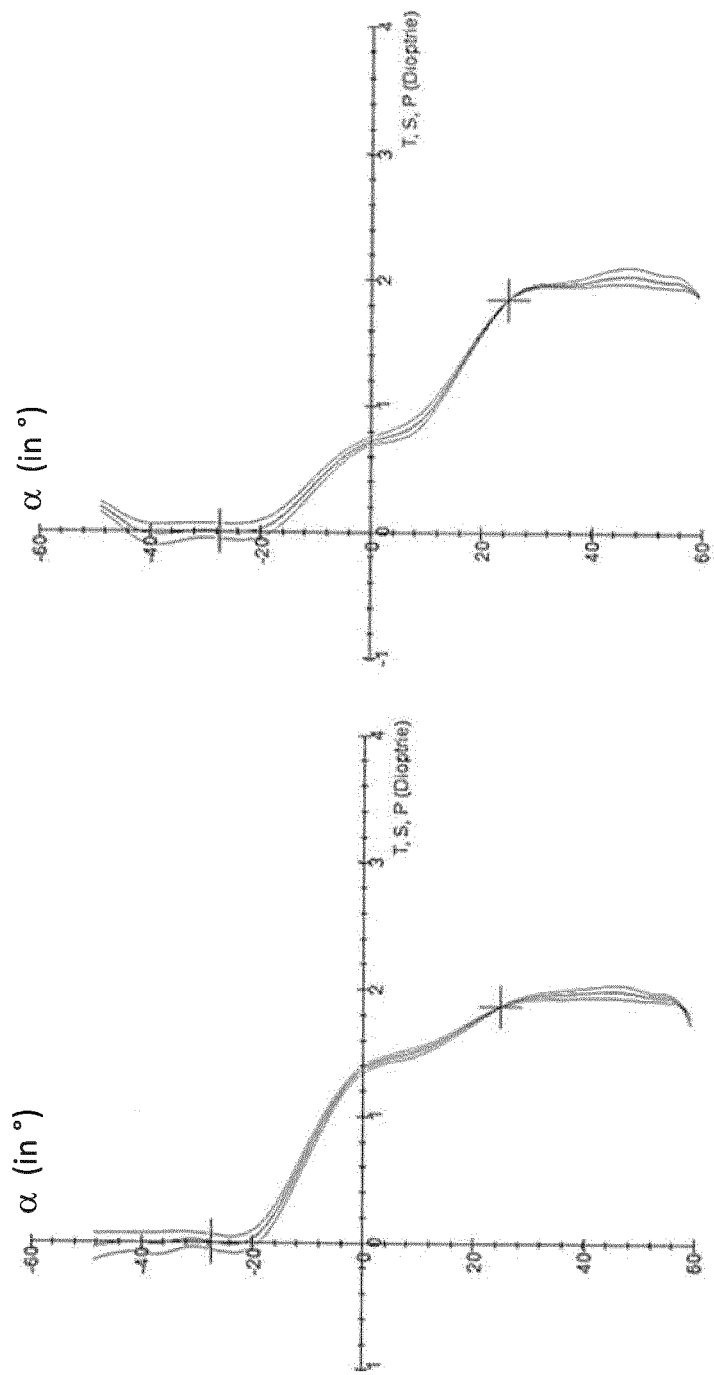

OPHTHALMIC LENS AND METHOD FOR DETERMINING THE SAME

FIELD OF THE INVENTION

The invention is in the field of ophthalmic lenses and, more particularly, it relates to an ophthalmic lens which is adapted for specialty and occupational use rather than for general use and method for determining such lenses. Lenses according to the invention are in particular recommended for casual wearer: for example for equipping a first spectacle of young presbyopic wearers or either as a second spectacle to complement a main spectacle for correcting presbyopia, progressive addition lenses as defined § 8.3.5 in standard ISO 13666:2012, of confirmed wearers.

BACKGROUND OF THE INVENTION

A wearer may be prescribed a positive, null or negative optical power correction. For presbyopic wearers, the value of the power correction is different for far-vision and near-vision, due to the difficulties of accommodation in near-vision. Ophthalmic lenses suitable for presbyopic wearers are multifocal lenses, the most suitable being progressive multifocal lenses.

This present invention relates to mid-distance ophthalmic lenses that is to say lenses that do not have any far vision zone. Such lenses are not "progressive addition lenses" in the classical sense of the term. They are neither single vision lenses since they have at least one near vision zone and an intermediate vision zone, nor bifocal or trifocal lenses since they have at least one progression zone between their near vision zone and the intermediate vision zone.

Literature data on the use of computer screens show a great variability at the viewing distance, see for instance Jaschinski 2002 *"The proximity-Fixation-Disparity curve and the preferred viewing distance at a visual display as an indicator of near vision fatigue"*, Optometry and Vision Science; Vol. 79, No. 3, pp 158-169. In this paper, authors measured the distance to the screen for 40 individuals free to place their screen as comfortable as possible. Results showed a distance between the eye and the computer screen equal to 63±25.5 cm.

The average size of recent TV screens is 36/37 inches, which corresponds to a viewing distance of 190±50 cm. However, the TV screen size are ranging from 20 to 80 inches which results in distance to the screen highly variable. The television screen may also be placed on the floor or on furniture which results in lowering of gaze direction also highly variable.

Likewise, the viewing distance of a computer screen, or of a tablet, or of an eBook reader, or of a smartphone varies with the average size of the screen.

For example, the average size of a computer screen is about 15 inches, with a ratio between the height and the width of 1.7, which corresponds to a mean viewing distance of about 63 cm, with a standard deviation of 13 cm.

As another example, for a tablet with an average size superior to 8.5 inches, with a ratio height/width of the tablet between 0.62 and 0.75, the mean viewing distance is of about 39.7 cm with a standard deviation of 6 cm.

For example, the average size of a eBook reader is 6 inches, with a ratio between the height and the width of 0.75, which corresponds to a viewing distance of about 38 cm with a standard deviation of 6.5 cm, and the average size of recent smartphones is 5 inches, with a ratio between the height and the width of 0.56, which corresponds to a mean viewing distance of about 33.8 cm with a standard deviation of 5.1 cm.

If one considers a mid-distance lens, or "occupational lens" or "degressive-power lens" as defined in § 8.3.6 in ISO 13666:2012, whose near vision zone, intermediate vision zone are calculated from an average posture, one can easily understand that a single lens will not suit everyone because of the variety of screen types, and the wearer individual variability in screen uses.

Therefore, there is a need for an ophthalmic lens that is adapted to the individual variability in screen uses, mainly for new electronic screens.

One object of the present invention is to provide such ophthalmic lenses for improving the comfort of a wearer reading a text or working with new electronic screens.

SUMMARY OF THE INVENTION

To this end, the invention proposes an ophthalmic lens intended for correcting a wearer's eye vision in compliance with a desired value of optical power and/or a desired value of astigmatism in given wearing conditions related to an electronic display observance, said ophthalmic lens comprising:
  a first optical portion OP1 having in said given wearing conditions a substantially constant optical power P1; said first optical portion OP1 being located in a lower part of said lens when said lens is placed in said given wearing conditions said first optical portion OP1 being delimited by a first contour;
  a second optical portion OP2 having in said given wearing conditions a substantially constant optical power P2 with SADD=P2−P1>0; said second optical portion OP2 being located in said lower part of said lens at a lower position than said first optical portion OP1, said second optical portion OP2 being delimited by a second contour;
  a reference point RP located within said first optical portion OP1 where a measure of optical power equals said desired value of optical power;
  wherein said ophthalmic lens further comprising a channel line CL passing by said reference point RP, said channel line crossing an upper part of said first contour in a first point WPA1 and a lower part of said first contour in a second point WPA2, said channel line CL crossing an upper part of said second contour in a third point WPB1, wherein the absolute difference between the optical power on any point of said first optical portion OP1 and the optical power at the reference point RP is smaller than 0.06 Diopter; wherein the absolute difference between the optical power on any point of said second optical portion OP2 and the optical power at said third point WPB1 is smaller than 0.12 Diopter; the first and second optical portions extending at least over 3 mm along the channel line, and at least over 3 mm along a direction substantially perpendicular to the channel line.

According to the invention, the power gradient along the channel line between any pair of points located on the channel line between said second point WPA1 and said third point WPB1 is positive.

As shown in the above-mentioned study, the reading tasks of paper document are performed in the near vision situation with an average lowering angle of gaze direction of 18°; writing tasks are performed with an average lowering angle of gaze direction 12°; reading text displayed on a smart phone screen is performed with an average lowering angle of gaze direction comprised between 11° and 39°. For reading on a tablet screen the average lowering angle of gaze direction is comprised between 5° and 35°. Reading a text on an eBook reader screen requires for the reader a lowering angle of gaze direction comprised 6° and 34°.

The solution of the invention has the advantage that it allows a reader wearing lens according to the invention to perform through the first optical portion OP1 whole set of reading and writing task on paper document and it also covers a part of task domain performed with smart phone, tablet and an eBook reader, the lowering gaze values being between 12° and 27°.

The solution of the invention has the additional advantage that it allows a reader wearing lens according to the invention to perform, through the second optical portion OP2, the complementary part of the domain use of tablet screen and e-reader screen, or eBook screen.

According to further embodiments which can be considered alone or in combination:

said first optical portion OP1 is determined such that when wearer's gaze is directed to a point of said first optical portion OP1 the wearer looks comfortably at a first electronic screen, disposed at a first distance of the wearer in a first near vision situation and said second optical portion OP2 is determined such that when wearer's gaze is directed to a point of said second optical portion OP2 the wearer looks comfortably at a second electronic screen disposed at a second distance of the wearer smaller than the first distance and with an in a second near vision situation, for example said first and second screen are a smart phone screen, a phablet screen or an eBook reader screen or a tablet screen;

said ophthalmic lens further comprising a third optical portion OP3 having a substantially constant optical power P3 in said given wearing conditions with and DDG1=P3−P1<0; said third optical portion OP3 being located upper than said first optical portion OP1, said channel line crossing a lower part of said third contour in a fourth point WPC2, wherein the absolute difference between the optical power on any point of said third optical portion OP3 and the optical power at said fourth point WPC2 is smaller than 0.12 Diopter; the third optical portion extending at least over 3 mm along the channel line and at least over 3 mm along a direction substantially perpendicular to the channel line; the power gradient along the channel line between any pair of points located on the channel line between said fourth point WPC2 and said first point WPA1 is positive;

said third optical portion OP3 is determined such that when wearer's gaze is directed to a point of said third optical portion OP3 the wearer looks comfortably at a third electronic screen, for example a computer screen, disposed at a third distance of the wearer in a third near vision situation where said third distance is greater than said first distance;

said ophthalmic lens further comprising a fourth optical portion OP4 having a substantially constant optical power P4 in said given wearing conditions with and DDG2=P4−P1<0; more than 50% of the surface of said fourth optical portion OP4 being located within an upper part of said lens and located upper than said third optical portion OP3, said channel line crossing a lower part of said fourth contour in a fifth point WPD2, wherein the absolute difference between the optical power on any point of said fourth optical portion OP4 and the optical power at said fifth point WPD2 is smaller than 0.12 Diopter, the fourth optical portion extending at least over 3 mm along the channel line and at least over 3 mm along a direction substantially perpendicular to the channel line; the power gradient along the channel line between any pair of points located on the channel line between said fifth point WPD2 and said first point WPA1 is positive;

said fourth optical portion OP4 is determined such that when wearer's gaze is directed to a point of said fourth optical portion OP4 the wearer looks comfortably at a fourth electronic screen, for example a TV screen, disposed at a fourth distance of the wearer in a fourth near vision situation where said fourth distance is greater than said third distance;

the reference point RP is positioned such that the gaze direction lowering angle from the fitting cross to the reference point RP is comprised between 16° and 26°, the first optical portion OP1 is determined such that the gaze direction lowering angle from the fitting cross FC to the first point WPA1 is greater or equal to 12° and the gaze direction lowering angle from the fitting cross FC to the second point WPA2 is lower or equal to 27°, the second optical portion OP2 is determined such that the gaze direction lowering angle from the fitting cross FC to the third point WPB1 is strictly greater than 27°; and 0.125 SADD 0.75 Diopter;

the third optical portion OP3 is positioned such that the gaze direction lowering angle from the fitting cross FC to said fourth point WPC2 is lower or equal to 8° and 0.125≤|DDG1|2.5 Diopter preferably 0.25≤|DDG1|≤2.5 Diopter;

the fourth optical portion OP4 is positioned such that the gaze direction lowering angle from the fitting cross FC to said fourth point WPD2 is lower or equal to 2° and 0.25|≤DDG2|≤2.5 Diopter preferably 0.5≤|DDG2|≤2.5 Diopter;

the second optical portion OP2 is determined such that the gaze direction lowering angle from the fitting cross FC to the third point WPB1 is greater or equal to 27° and SADD 0.6 Diopter;

the second optical portion OP2 is determined such that the gaze direction lowering angle from the fitting cross FC to the third point WPB1 is greater or equal to 27° and SADD 0.4 Diopter;

the second optical portion OP2 is determined such that the gaze direction lowering angle from the fitting cross FC to the third point WPB1 is greater or equal to 27° and SADD 0.25 Diopter.

As also shown in the above-mentioned study, the working tasks on a computer screen requires a lowering angle of gaze direction comprised between 0° and 8°. The solution of the invention has the additional advantage that it allows a reader wearing a lens according to the invention, through the third optical portion OP3, to work comfortably on a computer screen.

The solution of the invention has the additional advantage that it allows a reader wearing a lens according to the invention, through the fourth optical portion OP4, to watch comfortably on a TV screen because such tasks require a lowering angle of gaze direction substantially equal to 0° which means that the wearer is looking straight forward.

According to a further aspect, the invention relates to a method implemented by computer means for determining an ophthalmic lens for a wearer adapted for providing to said wearer a comfortable vision when looking at electronic displays. According to the invention, said method comprises:
- a wearer near vision electronic display use determining step S1 during which at least an electronic display the wearer intends to use in a near vision situation is determined;
- a wearer intermediate vision electronic display use determining step S2 during which at least an electronic display the wearer intends to use in an intermediate vision situation is determined;
- an usage priority rank determining step S3 during which an usage priority rank between said near vision electronic display during said wearer near vision electronic display use determining step S1 and said intermediate vision electronic display is determined during said wearer intermediate vision electronic display use determining step S2;
- an ophthalmic lens determining step S4 during which an ophthalmic lens is determined from said at least one near vision electronic display or said at least one intermediate vision electronic display and said usage priority rank.

According to further embodiments which can be considered alone or in combination:
- the ophthalmic lens determining step S4 comprises a step of selecting a lens design for providing a lens to said wearer among a set of predefined lens designs;
- the method further comprises a postural data determining step during which postural data of said wearer is determined when said wearer is looking at one near vision electronic display determined during said wearer near vision electronic display use determining step S1 or said at least one intermediate vision electronic display said wearer intermediate vision electronic display use determining step S2 wherein said ophthalmic lens determining step S4 further takes into account said measured postural data.

The invention further relates to a method, implemented by computer means, for determining an optical design of an ophthalmic lens adapted to a wearer, the method comprising:
- a wearer data providing step, during which wearer data comprising at least an indication of a wearer's prescription are provided;
- a first optical power determining step, during which a first optical power P1 relative to a first viewing distance is determined based on the wearer data, the first viewing distance being comprised between 20 cm and 400 cm;
- a second optical power determining step, during which a second optical power P2 relative to a second viewing distance is determined based on the wearer data, the second viewing distance being comprised between 20 cm and 400 cm, the second viewing distance being smaller than the first viewing distance, and the second optical power P2 being strictly greater than the first optical power P1;
- an optical design determining step, during which a first and second optical portions are determined,
- the first optical portion OP1 being located in the lower part of the ophthalmic lens, the first optical portion OP1 being delimited by a first contour, the first optical portion OP1 having a first substantially constant optical power such that the absolute difference between the optical power on any point of the first optical portion OP1 and the determined first optical power P1 is smaller than 0.06 Diopter,
- the second optical portion OP2 being located in the lower part of the ophthalmic lens at a lower position than the first optical portion, the second optical portion OP2 being delimited by a second contour, the second optical portion OP2 having a second substantially constant optical power such that the absolute difference between the optical power on any point of the second optical portion OP2 and the determined second optical power P2 is smaller than 0.12 Diopter,
- wherein a channel line CL passing by a point of the first optical portion OP1 having the determined first optical power P1, the channel line CL crossing a lower part of the first contour in a first point WPA2 and an upper part of the second contour in a second point WPB1, the power gradient along the channel line CL between any pair of points located on the channel line between the first point WPA2 and the second point WPB1 being positive, and
- wherein the first and second optical portions extending at least over 3 mm along the channel line CL, and at least over 3 mm along a direction substantially perpendicular to the channel line CL.

According to further embodiments which can be considered alone or in combination:
- the method further comprises a third optical power determining step, during which a third optical power P3 relative to a third viewing distance is determined based on the wearer data, the third viewing distance being comprised between 20 cm and 400 cm, the third viewing distance being greater than the first viewing distance, and the third optical power P3 being strictly smaller than the first optical power P1;
- wherein during the optical design determining step, a third optical portion OP3 is determined
- the third optical portion OP3 being located upper than the first optical portion OP1, the third optical portion OP3 being delimited by a third contour,
- the channel line CL crossing a lower part of the third contour in a third point WPC2 and a upper part of the first contour in a fourth point WPA1,
- the third optical portion OP3 having a substantially constant optical power such that the absolute difference between the optical power on any point of the third optical portion OP3 and the optical power at the third point WPC2 is smaller than 0.12 Diopter,
- wherein the power gradient along the channel line CL between any pair of points located on the channel line between the third point WPC2 and the first point WPA1 being positive, and wherein the third optical portion OP3 extending at least over 3 mm along the channel line CL, and at least over 3 mm along a direction substantially perpendicular to the channel line CL; and/or
- the method further comprises a fourth optical power determining step, during which a fourth optical power P4 relative to a fourth viewing distance is determined based on the wearer data, the fourth viewing distance being comprised between 20 cm and 400 cm, the fourth viewing distance being greater than the third viewing distance, and the fourth optical power P4 being strictly smaller than the first optical power P1;
- wherein during the optical design determining step, a fourth optical portion OP4 is determined,
- more than 50% of the surface of the fourth optical portion OP4 being located within the upper part of the ophthalmic lens and located upper than the third optical portion OP3, the channel line CL crossing a lower part of the fourth contour in a fifth point WPD2, the fourth optical portion OP4 having a substantially constant optical power such that the absolute difference between the optical power on any point of the fourth optical portion OP4 and the optical power at the fifth point WPD2 is smaller than 0.12 Diopter, wherein the power gradient along the channel line CL between any pair of points located on the channel line between the fifth point WPD2 and the first point WPA1 being positive, and wherein the fourth optical portion OP4 extending at least over 3 mm along the channel line CL, and at least over 3 mm along a direction substantially perpendicular to the channel line CL.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. These apparatuses may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which:

FIGS. 11 and 12 give optical characteristics for an example of ophthalmic lens according to the invention where the step S4 of the method according to the invention comprises a wearer postural data measuring step for two different measured value of screen distance in intermediate vision situation.

It can be appreciated that elements in the figures are illustrated for simplicity and clarity and have not necessarily been drawn to scale. For example, the dimensions of some of the elements in the figures may be exaggerated relatively to other elements to help improving the understanding of the embodiments of the present invention.

Definitions

The following definitions are provided to describe the present invention.

"Prescription data" are known in the art. Prescription data refers to one or more data obtained for the wearer and indicating for each eye a prescribed far vision mean refractive power $P_{FV}$, and/or a prescribed astigmatism value $CYL_{FV}$ and/or a prescribed astigmatism axis $AXE_{FV}$ and/or a prescribed addition A suitable for correcting the ametropia and/or presbyopia of each eye. The mean refractive power $P_{FV}$ is obtained by summing the half value of the prescribed astigmatism value $CYL_{FV}$ to the prescribed sphere value $SPH_{FV}$: $P_{FV}=SPH_{FV}+CYL_{FV}/2$. Prescription data also refers to one or more data obtained for the wearer and indicating for each eye a prescribed near vision mean refractive power $P_{NV}$, and/or a prescribed astigmatism value $CYL_{NV}$ and/or a prescribed astigmatism axis $AXE_{NV}$. The mean refractive power $P_{NV}$ is obtained by summing the half value of the prescribed astigmatism value $CYL_{NV}$ and the prescribed sphere value $SPH_{NV}$: $P_{NV}=SPH_{NV}+CYL_{NV}/2$.

"Ophthalmic lenses" are known in the art. According to the invention, the ophthalmic lens may be selected from progressive and regressive lenses; monofocal, bifocal, or more generally multifocal lenses. The lens may be for use in spectacles, also called eyeglasses, as contact lenses or as intraocular implants. The lens may also be a lens for information glasses, wherein the lens comprises means for displaying information in front of the eye. Preferred lenses according to the invention are degressive power ophthalmic lenses. All ophthalmic lenses of the invention may be paired so as to form a pair of lenses, comprising a left eye LE and a right eye RE.

Figure 1:
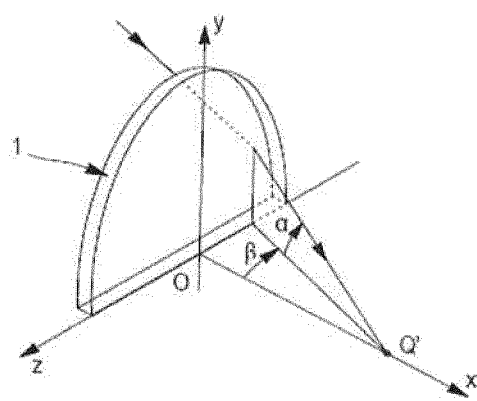
FIGS. 1 to 3 show, diagrammatically, optical systems of eye and lens and ray tracing from the center of rotation of the eye.
Figure 2:
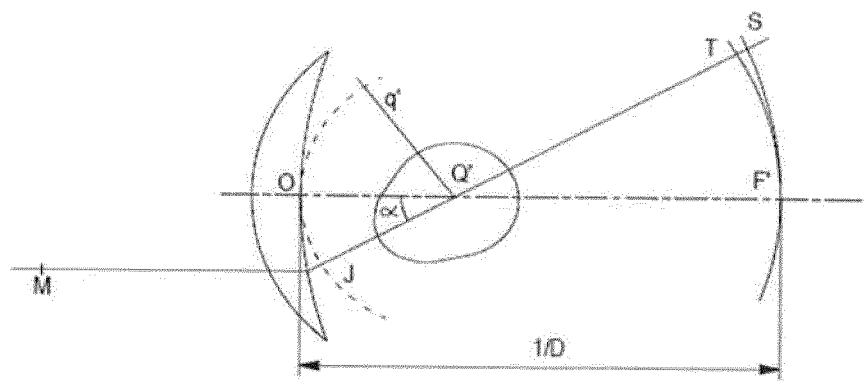

A "gaze direction" can be identified by a couple of angle values (α, β), wherein said angles values are measured with regard to reference axes centered on the center of rotation of the eye (CRE). More precisely, FIG. 1 represents a perspective view of such a system illustrating parameters α and β used to define a gaze direction. FIG. 2 is a view in the vertical plane parallel to the antero-posterior axis of the wearer's head and passing through the center of rotation of the eye in the case when the parameter β is equal to 0. The center of rotation of the eye is labeled Q'. The axis Q'F', shown on FIG. 2 in a dot-dash line, is the horizontal axis passing through the center of rotation of the eye and extending in front of the wearer—that is the axis Q'F' corresponding to the primary gaze direction. This axis cuts the front surface of the lens on a point called the fitting cross, which is present on lenses to enable the positioning of lenses in a frame by an optician. The fitting cross corresponds to a lowering angle α of 0° and an azimuth angle β of 0°. The fitting cross FC is also often considered as the origin of a frame of the lens surface. The point of intersection of the rear surface of the lens and the axis Q'F' is the point O. O can be the fitting cross if it is located on the rear surface. A vertex sphere, of center Q', and of radius q', which is intercepting the rear surface of the lens in a point of the horizontal axis. As example, a value of radius q' of 25.5 mm corresponds to a usual value and provides satisfying results when wearing the lenses.

A given gaze direction—represented by a solid line on FIG. 1—corresponds to a position of the eye in rotation around Q' and to a point J, represented on FIG. 2, of the vertex sphere; the angle β is the angle formed between the axis Q'F' and the projection of the straight line Q'J on the horizontal plane comprising the axis Q'F'; this angle appears on the scheme on FIG. 1. The angle α is the angle formed between the axis Q'J and the projection of the straight line Q'J on the horizontal plane comprising the axis Q'F'; this angle appears on the scheme on FIGS. 1 and 2. A given gaze view thus corresponds to a point J of the vertex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

On the lens, for each gaze direction (α, β), a refractive power $P_{\alpha,\beta}$, a module of astigmatism $Asr_{\alpha,\beta}$ and an axis Axe of this astigmatism, and a module of resulting, also called residual or unwanted, astigmatism $Asr_{\alpha,\beta}$ are defined.

"Optical design" is a widely used wording known from the man skilled in the art in ophthalmic domain to designate the set of parameters allowing to define a dioptric function of an ophthalmic lens, the dioptric function corresponding to the ophthalmic lens power, such as mean power or astigmatism, as a function of the gaze direction. Each ophthalmic lens designer has its own designs, particularly for progressive ophthalmic lenses. As for an example, a progressive ophthalmic lens "design" results of an optimization of a progressive surface so as to restore a presbyope's ability to see clearly at all distances but also to optimally respect all physiological visual functions such as foveal vision, extra-foveal vision, binocular vision and to minimize unwanted astigmatisms. For example, a progressive lens design comprises a power profile along the main gaze direction, namely along the meridian line, used by the lens wearer during day life activities, and comprises distributions of powers, for instance mean power or astigmatism, on the sides of the lens, that is to say away from the main gaze direction.

These optical characteristics are part of the "designs" defined and calculated by ophthalmic lens designers and that are provided with the lenses.

The "wearing conditions", or "standard wearing conditions" are to be understood as the position of the lens with relation to the eye of a standard wearer, notably defined by a pantoscopic angle of −8°, a lens-pupil distance of 12 mm, a pupil-eye rotation center of 13.5 mm and a wrap angle of 0°.

The pantoscopic angle is the angle in the vertical plane between the optical axis of the spectacle lens and the visual axis of the eye in the primary position, usually taken to be the horizontal.

The wrap angle is the angle in the horizontal plane between the optical axis of the spectacle lens and the visual axis of the eye in the primary position, usually taken to be the horizontal.

Other conditions may be used. Wearing conditions may be calculated from a ray-tracing program, for a given lens.

Further, the optical power and the astigmatism may be calculated so that the prescription is either fulfilled at the reference points, namely at the control points in far vision, and for a wearer wearing his spectacles in the wearing conditions or measured by a frontofocometer.

"Ergorama" is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value towards the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia. In the context of a unifocal lens, the ergorama may be defined as a plane situated at infinity distance.

Using these elements, it is possible to define a wearer optical power and astigmatism, in each gaze direction. An object point M at an object distance given by the ergorama is considered for a gaze direction (α, β). An object proximity ProxO is defined for the point M on the corresponding light ray in the object space as the inverse of the distance MJ between point M and point J of the vertex sphere:

$$ProxO = 1/MJ$$

This enables to calculate the object proximity within a thin lens approximation for all points of the vertex sphere, which is used for the determination of the ergorama. For a real lens, the object proximity can be considered as the inverse of the distance between the object point and the front surface of the lens, on the corresponding light ray.

For the same gaze direction (α, β), the image of a point M having a given object proximity is formed between two points S and T which correspond respectively to minimal and maximal focal distances, which would be sagittal and tangential focal distances. The quantity ProxI is called image proximity of the point M:

$$ProxI = \frac{1}{2}\left(\frac{1}{JT} + \frac{1}{JS}\right)$$

The optical power is also called refractive power.

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui = ProxO + ProxI$$

With the same notations, an astigmatism Ast is defined for every gaze direction and for a given object proximity as:

$$Ast = \left| \frac{1}{JT} - \frac{1}{JS} \right|$$

This definition corresponds to the astigmatism of a ray beam created by the lens.

Figure 3:
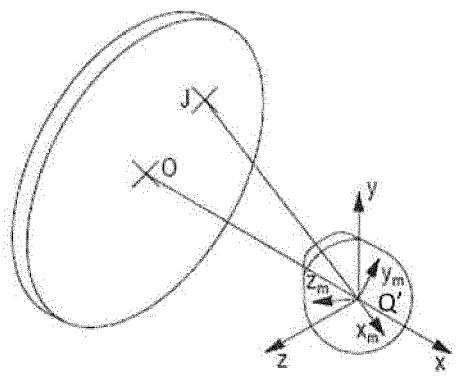
Figure 4:
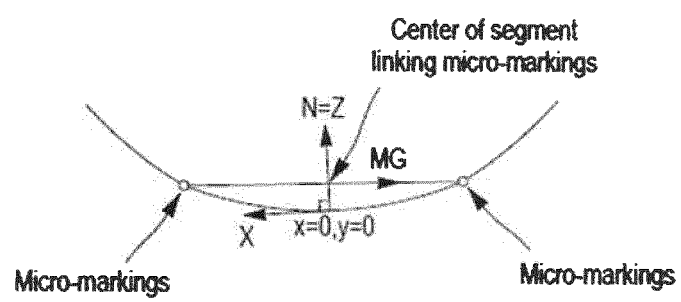
FIGS. 4 and 5 show referentials defined with respect to micro-markings, for a surface bearing micro-markings and for a surface not bearing the micro-markings respectively.
Figure 5:
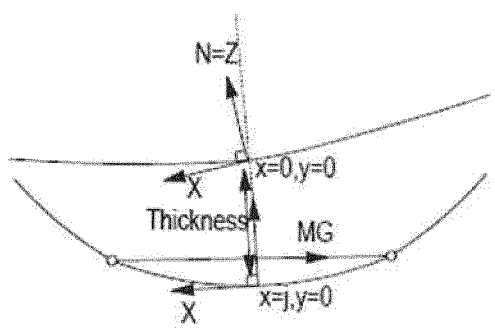

FIG. 3 represents a perspective view of a configuration wherein the parameters α and β are non-zero. The effect of rotation of the eye can thus be illustrated by showing a fixed frame {x, y, z} and a frame {xm, ym, zm} linked to the eye. Frame {x, y, z} has its origin at the point Q'. The x-axis is the axis Q'O and it is orientated from the lens towards the eye. The y-axis is vertical and orientated upwardly. The z-axis is such that the frame {x, y, z} is orthonormal and direct. The frame {xm, ym, zm} is linked to the eye and its center is the point Q'. The xm-axis corresponds to the gaze direction JQ'. Thus, for a primary gaze direction, the two frames {x, y, z} and {xm, ym, zm} are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to the ergorama-eye-lens system described above. For simplicity, the term 'lens' is used in the description but it has to be understood as the 'ergorama-eye-lens system'. The value in surface terms can be expressed with relation to points. The points are located with the help of abscissa or ordinate in a frame as defined above with respect to FIGS. 4 and 5.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—rear surface or front surface.

The above description made with reference to FIGS. 1-3 was given for central vision. In peripheral vision, as the gaze direction is fixed, the center of the pupil is considered instead of center of rotation of the eye and peripheral ray directions are considered instead of gaze directions. When peripheral vision is considered, angle α and angle β correspond to ray directions instead of gaze directions.

In the remainder of the description, terms like "up", "bottom", "horizontal", "vertical", "above", "below", or other words indicating relative position may be used. These terms are to be understood in the wearing conditions of the lens.

Notably, the "upper" part of the lens corresponds to a negative lowering angle α<0° and the "lower" part of the lens corresponds to a positive lowering angle α>0°.

Notably, one defines that an optical portion is "mostly located in a part, upper or lower, of the lens when more than 50% of the surface of the optical portion is within said part.

Similarly, the "upper" part of the surface of a lens—or of a semi-finished lens blank—a "surfacic" concept—corresponds to a positive value when expressed in millimeter along the y-axis, and preferably to a value along the y-axis superior to the y value corresponding to the fitting cross. The "lower" part of the surface of a lens—or of a semi-finished lens blank—a "surfacic" concept—corresponds to a negative value when expressed in millimeter along the y-axis in the frame as defined above with respect to FIGS. 4 and 5, and preferably to a value along the y-axis inferior to the y_value at the fitting cross.

The "channel line" is defined for a lens as the line containing the gaze directions that corresponds to the minimum of resulting astigmatism or the line located at almost equal distance from two gaze directions through the lens respectively on the nasal side and the temporal side, with same values for the lowering angle and also same values for the resulting astigmatism. Each channel line are contained in a vertical plane above the fitting cross, and deflected towards the nasal side below the fitting cross.

"micro-markings" have been made mandatory on progressive lenses by the harmonized standard ISO 8990-2. "Temporary markings" may also be applied on at least one of the two surfaces of the lens, indicating positions of control points, also called reference points, on the lens, such as a control point for far-vision, a control point for near-vision, a prism reference point and a fitting cross for instance. The prism reference point PRP is considered here at the midpoint of the straight segment which connects the micro-markings. If the temporary markings are absent or have been erased, it is always possible for a skilled person to position the control points on the lens by using a mounting chart and the permanent micro-markings. Similarly, on a semi-finished lens blank, standard ISO 10322-2 requires micro-markings to be applied. The center of the aspherical surface of a semi-finished lens blank can therefore be determined as well as a referential as described above.

DETAILED DESCRIPTION OF THE INVENTION

Figure 9:
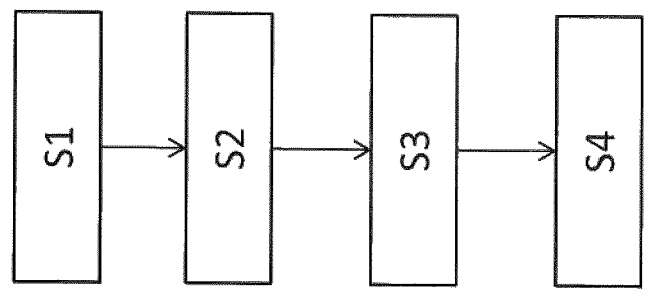
FIG. 9 is an illustration of a chart-flow of an embodiment of the method according to the invention.

As illustrated on FIG. 9, the method according to the invention comprises at least:
- a wearer near vision electronic display use determining step S1;
- a wearer intermediate vision electronic display use determining step S2 during which at least a second type of electronic display the wearer intends to look at in an intermediate vision situation is determined;
- an usage priority rank determining step S3 during which an usage priority rank between said types of display is determined;

an ophthalmic lens determining step S4 during which an ophthalmic lens is determined from said at least on type of first display, said at least on type of first display and said usage priority rank.

At the end of step S4, a determination of a lens design for the wearer is provided. Steps S1 to S3 correspond to a way for expressing the needs of the wearer relatively to the use of electronic displays. For illustration, one describes steps S1 and S2 as simple question that can be asked under the form of a written questionnaire by an eye care professional ECP. But this way of describing the process is not limiting: for example the method may be implemented as an internet survey before going to the ECP, or as a direct choice within a closed list of types of designs.

During the wearer near vision electronic display use determining step S1, at least an electronic display the wearer intends to use in a near vision situation is determined. For example, a question asked during step S1 may be: "What are the types of screens that you use in near vision situation?". The answers made by the wearer to these questions contribute to establish the number of useful optical portion OP1, OP2 and implicitly their features to specify in near vision in order to fulfill his/her needs.

During the wearer intermediate vision electronic display use determining step S2, at least a second type of electronic display the wearer intends to look at in a near vision situation is determined. For example, a question asked during step S2 may be: "What are the types of screens that you use for intermediate vision tasks? Desktop computer, Laptop, TV, video projector ... ". The answers made by the wearer to these questions contribute to establish the number of useful optical portion OP3, OP4 to specify in intermediate vision in order to fulfill his/her needs.

During the usage priority rank determining step S3, a usage priority rank between the above-mentioned types of display is determined. For example, a question asked during step S3 may be: "Among these mentioned display types, which one do you favor in everyday life?". The answer made by the wearer to this question allows determining on which type of display, the lens performance should prioritize.

During the ophthalmic lens determining step S4, one may select a lens design for providing a lens to said wearer among a set of predefined lens designs at previous steps.

The set of predefined lens designs comprises for example:
- a first lens design mainly adapted for the vision by said wearer of a smart phone or a smart watch in near vision situation and secondarily adapted for the vision by said wearer of a computer display in an intermediate vision situation;
- a second lens design mainly adapted for the vision by said wearer of a computer display in intermediate vision and secondarily adapted for the vision by said wearer of a smart phone or a smart watch in a near vision situation;
- a third lens design mainly adapted for the vision by said wearer of:
  - a TV screen in far intermediate vision, for instance through optical portion OP4,
  - a computer display in intermediate vision, for instance through optical portion OP3,
  - secondarily a tablet screen in near vision situation, for instance through optical portion OP1, and
  - secondarily a smart phone screen in ultra near vision situation, for instance through optical portion OP2.

Figure 6:
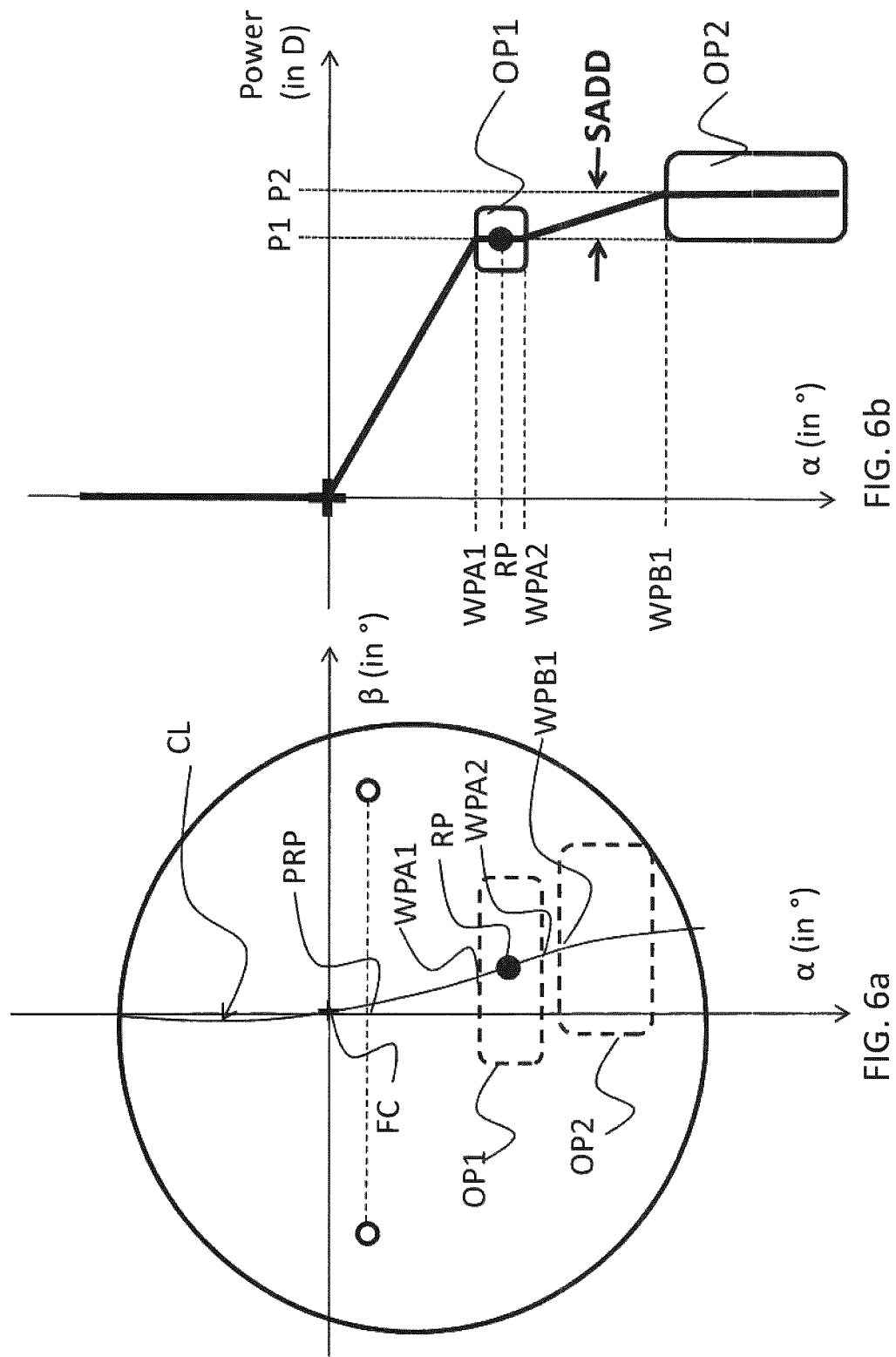
FIGS. 6a, 6b, 7a, 7b, 8a and 8b give optical characteristics for three examples of ophthalmic lenses according to the invention with simplified drawings.

FIGS. 6a and 6b show a specification of a lens design that can constitute a first predefined lens designs as introduced immediately above.

FIG. 6a shows a lens comprising a channel line CL. The x-axis and y-axis respectively give the angles [β] and [α] expressed in degrees (also noted °). On the lens surface, the fitting cross FC is located 4 mm above the Prism Reference Point (PRP) which is positioned at the middle of the micro-markings. It should be noticed that the fitting cross FC corresponds to a lowering angle α of 0° and an azimuth angle β of 0°.

FIG. 6b shows the mean refractive power along the channel line CL of an ophthalmic lens according to the invention. The x-axis is graduated in Diopters and the y-axis gives the height, in degrees of the ophthalmic lens according to the invention. The scale of y-axes of FIGS. 6a and 6b are slightly different in order to facilitate the comprehension of optical portion.

As illustrated on FIG. 6b, optical portions OP1 and OP2 may comprise sections along the meridian line of stabilized refractive power. Advantageously, such stabilized sections increase the visual comfort of the wearer when using the ophthalmic lens, in particular when using the lens for seeking a near and ultra near distances in the lower part of the lens.

A portion is to be considered as stabilized when the refractive power has a variation smaller than or equal to +/−0.06 Diopter (δ), for example smaller than or equal to +/−0.03 δ.

In the whole present application, any optical portion could be as small as an area extending over 3 mm along the channel line CL and as small as an area extending over 3 mm along the y-axis.

In other words, an optical portion extends at least over 3 mm along the channel line and at least over 3 mm along a direction substantially perpendicular to the channel line.

Given wearing conditions are considered for this ophthalmic lens. Optical power is measured or evaluated in said given wearing conditions.

This first predefined lens design comprises two optical portions OP1, OP2 in the lower part of the lens.

The first optical portion OP1 has in said given wearing conditions a substantially constant optical power P1. This first lens design is adapted for example for looking at a tablet screen when the gaze passes through the first optical portion OP1 and for looking at a smart phone screen when the gaze passes through the second optical portion OP2.

The first optical portion OP1 comprises a reference point RP where the optical power corresponds to the near vision prescribed power $P_{NV}$. For a presbyopic wearer one measures for example at the reference point RP a value of optical power equal to the prescribed optical power at far vision plus the prescribed addition or directly the prescribed optical power at near vision $P_{NV}$. The reference point RP is positioned 8 mm below the PRP. At the reference point RP, a measure of optical power is equal to the practitioner's optical power prescription.

Optical portions OP1 and OP2 are optically stabilized portions; that means for optical portion OP1 that the absolute difference between the optical power on any point of said first optical portion OP1 and the optical power at the reference point RP is smaller than 0.06 Diopter.

Said first optical portion OP1 is located in a lower part of said lens when said lens is placed in said given wearing conditions.

Said first optical portion OP1 being delimited by a first contour.

The ophthalmic lens further comprises a channel line CL passing by said reference point RP, said channel line CL crosses an upper part of said first contour in a first point WPA1 and a lower part of said first contour in a second point WPA2.

For example the reference point RP is positioned 25° below the fitting cross FC of the lens. The fitting cross FC of the lens is also positioned 4 mm above the prism reference point PRP located in middle of the micro markings, shown on FIG. 6a, even if the axis is expressed with angular values. For example the first point WPA1 is positioned 21° below the fitting cross of the lens and the second point WPA2 is positioned 27° below the fitting cross of the lens.

The second optical portion OP2 has in said given wearing conditions a substantially constant optical power P2 with SADD=P2−P1>0; said second optical portion OP2 is located in said lower part of said lens at a lower position than said first optical portion OP1. The second optical portion OP2 is delimited by a second contour. In other words, the upper part of the second contour is located farthest relative to the fitting cross than the lower part of the first contour. More precisely, in the wearing conditions, the second optical portion OP2 is located in a part of the ophthalmic lens lower than the part of the ophthalmic lens wherein the first optical portion OP1 is located. The y_value of a lower part of the first contour is greater than the y_value of an upper part of the second contour.

The absolute difference between the optical power on any point of said second optical portion OP2 and the optical power at said third point WPB1 is smaller than 0.12 Diopter.

For example the third point WPB1 is positioned 48° below the fitting cross of the lens and SADD=0.25 Diopter.

FIG. 6b shows that the power gradient along the channel line CL between any pair of points located on the channel line CL between said second point WPA1 and said third point WPB1 is positive.

Here, and in the whole present application, by "gradient along the channel line" one means gradient calculated between a first point located on the channel line, having a lowering gaze angle α1, and a second point located on the channel line, having a lowering gaze angle α2, where α1<α2.

Said first optical portion OP1 is determined such that when wearer's gaze is directed to a point of said first optical portion OP1 the wearer looks comfortably at a first electronic screen, disposed at a first distance of the wearer in a first near vision situation.

Said second optical portion OP2 is determined such that when wearer's gaze is directed to a point of said second optical portion OP2 the wearer looks comfortably at a second electronic screen disposed at a second distance of the wearer smaller than the first distance and with an in a second near vision situation, for example said first and second screen are a smart phone screen, a phablet screen or an eBook reader screen or a tablet screen.

Figure 7:
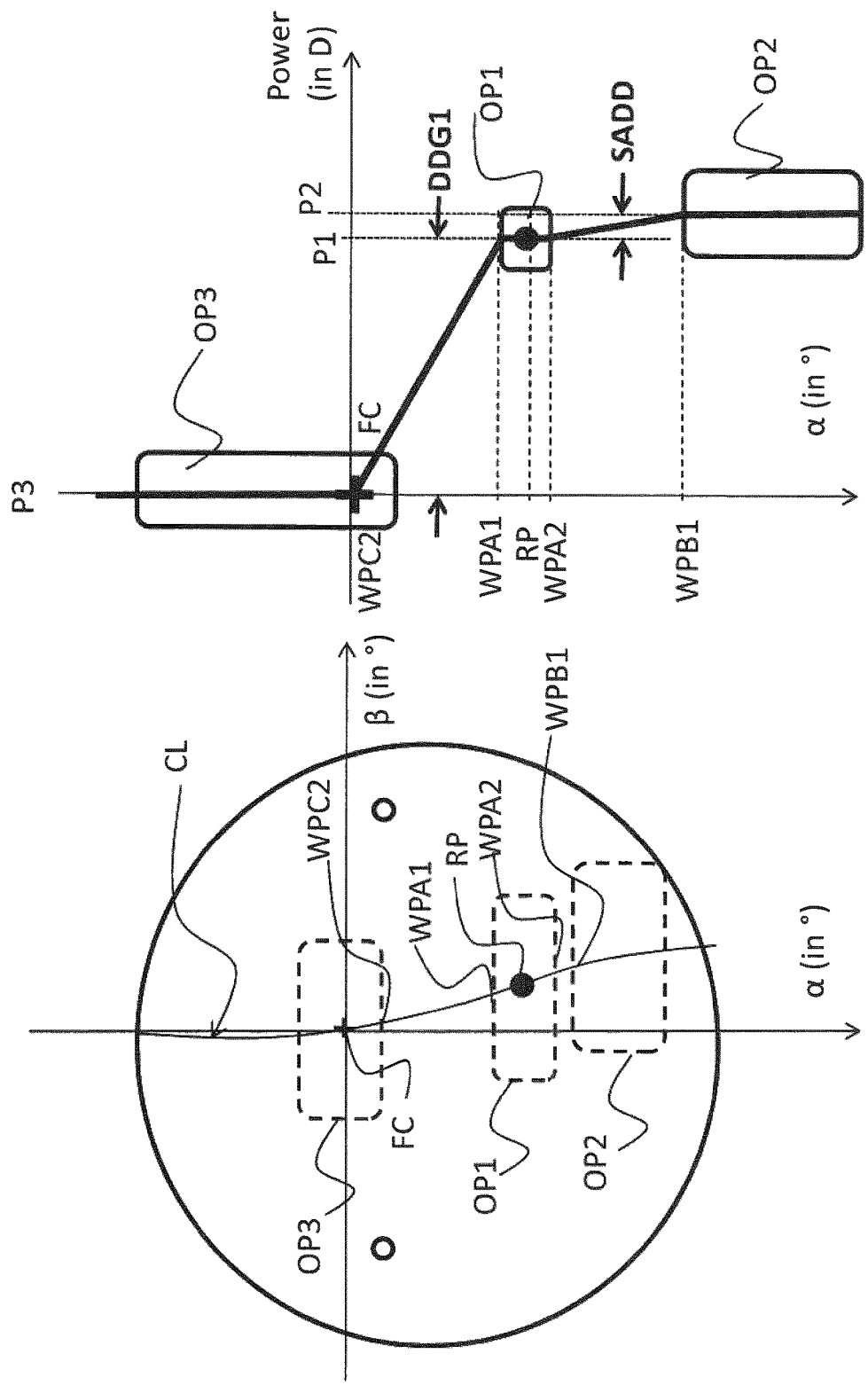
Figure 8:
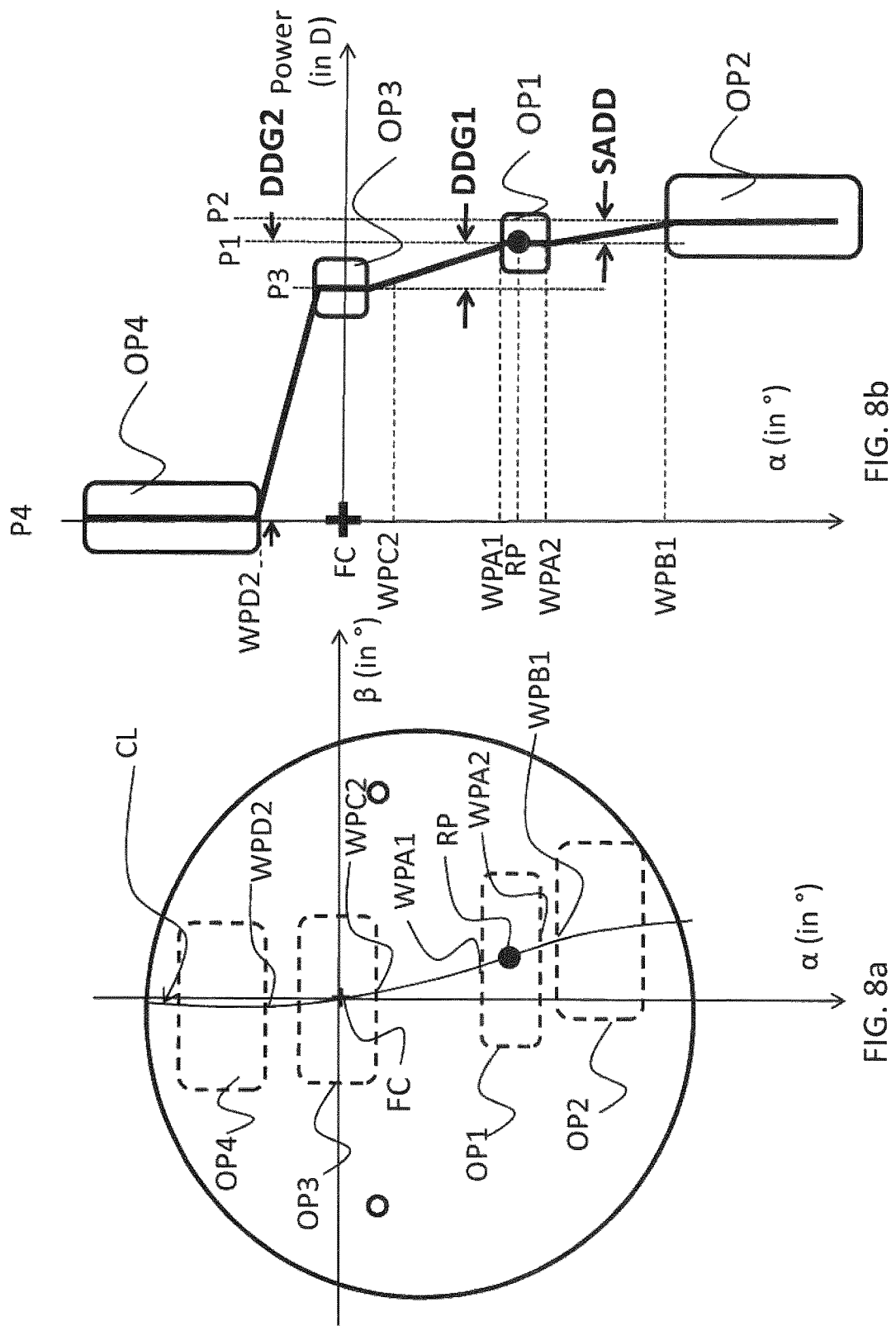

FIGS. 7a and 8a are similar representations than FIG. 6a for two other lens designs.

FIGS. 7b and 8b are similar representations than FIG. 6b for two other lens designs.

On FIGS. 7a and 7b, the lens design differs from the lens design shown on FIGS. 6a and 6b by an additional third optical portion OP3. Said optical portion OP3 has a substantially constant optical power P3 in said given wearing conditions with and DDG1=P3−P1<0. Said third optical portion OP3 is located upper than said first optical portion OP1. In other words, in the wearing conditions, the third optical portion OP3 is located in a part of the ophthalmic lens upper than the part of the ophthalmic lens wherein the first optical portion OP1 is located.

Advantageously, said third optical portion OP3 is mostly located in an upper part of said lens. This allows getting an optical portion mainly in the upper part of the lens for looking at a third type of displays in an extended vision situation or in an intermediate vision situation.

Advantageously, said third optical portion OP3 is located in a lower part of said lens. This allows getting a third optical portion in the lower part of the lens for looking at a third type of displays in a near vision situation or in an intermediate vision situation.

Said third optical portion OP3 being delimited by a third contour. The y_value of a lower part of the third contour is greater than the y_value of an upper part of the first contour.

Said channel line CL crosses a lower part of said third contour in a fourth point WPC2, wherein the absolute difference between the optical power on any point of said third optical portion OP3 and the optical power at said fourth point WPC2 is smaller than 0.12 Diopter.

FIG. 7b shows that the power gradient along the channel line CL between any pair of points located on the channel line between said fourth point WPC2 and said first point WPA1 is positive.

Said third optical portion OP3 is determined such that when wearer's gaze is directed to a point of said third optical portion OP3 the wearer looks comfortably at a third electronic screen, for example a computer screen, disposed at a third distance of the wearer in a third near vision situation where said third distance is greater than said first distance.

On FIGS. 8a and 8b the lens design differs from the lens design shown on FIGS. 7a and 7b by an additional fourth optical portion OP4. The fourth optical portion OP4 has a substantially constant optical power P4 in said given wearing conditions with and DDG2=P4−P1<0. Said fourth optical portion OP4 being mostly located in an upper part of said lens and located upper than said third optical portion OP3. In other words, in the wearing conditions, the fourth optical portion OP4 is located in a part of the ophthalmic lens upper than the part of the ophthalmic lens wherein the third optical portion OP3 is located. Said fourth optical portion OP4 being delimited by a fourth contour. The y_value of a lower part of the fourth contour is greater than the y_value of an upper part of the third contour. Said channel line CL crosses a lower part of said fourth contour in a fifth point WPD2. The absolute difference between the optical power on any point of said fourth optical portion OP4 and the optical power at said fifth point WPD2 is smaller than 0.12 Diopter.

FIG. 8b shows that the power gradient along the channel line CL between any pair of points located on the channel line between said fifth point WPD2 and said first point WPA1 is positive.

Said fourth optical portion OP4 is determined such that when wearer's gaze is directed to a point of said fourth optical portion OP4 the wearer looks comfortably at a fourth electronic screen, for example a TV screen, disposed at a fourth distance of the wearer in a fourth near vision situation where said fourth distance is greater than said third distance.

The example described here is not a limiting example; it is needless to say that there is no limitation for considering a number of optical portions greater than four if a wearer wishes to get an ophthalmic lens for getting a comfortable vision of a greater number of different electronic screens.

Based on the determined lens design, one manufactures the lens adapted to the wearer needs.

Figure 10C:
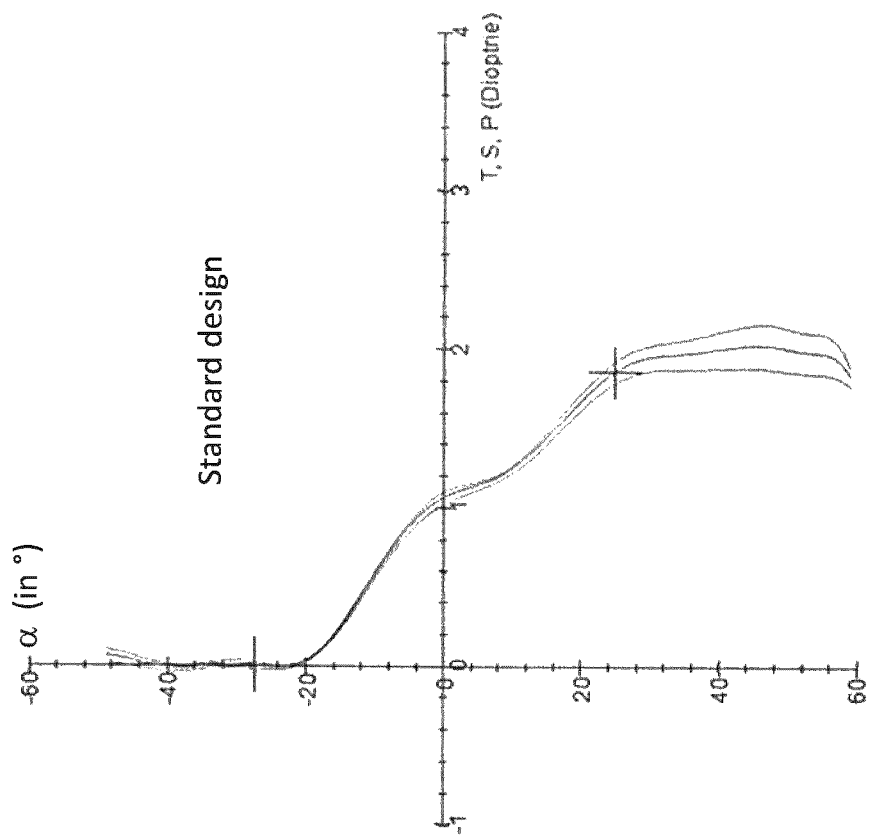
FIGS. 10a, 10b and 10c give optical characteristics for an example of ophthalmic lens according to the invention in an embodiment where the step S4 of the method according to the invention corresponds to a selection of a lens design among a set of predefined lens designs with four optical portions for viewing four different types of screens.
Figures 10A, 10B:
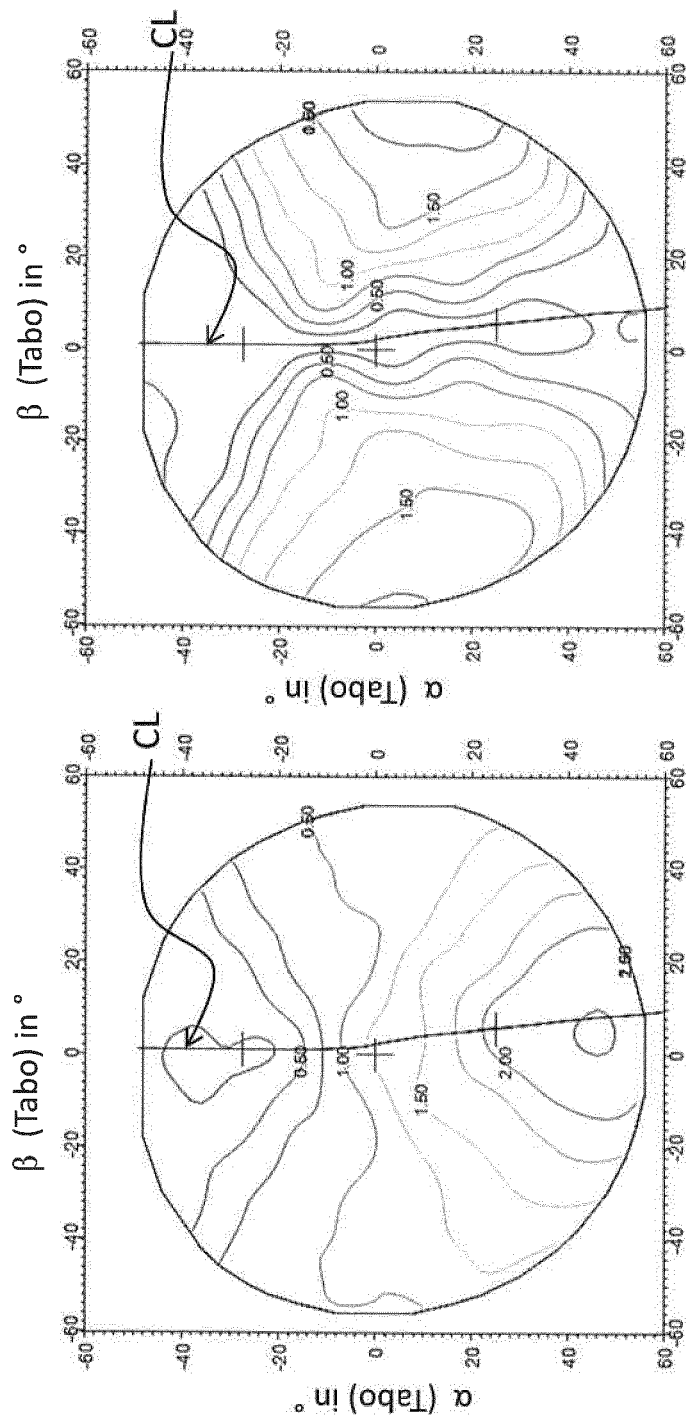

A result of this method is illustrated on FIGS. 10a, 10b and 10c in a case where the predefined third lens design cited above is determined under the wearing conditions from the expression of needs of the wearer.

FIG. 10a shows a refractive power map. The vertical and horizontal axes of the maps are the values of the lowering angle α and azimuth angle β of the gaze directions. The origin of the axes of FIGS. 10a and 10b corresponds to the fitting cross FC (α=0° and β=0°).

The isometric curves indicated on these maps connect gaze directions which correspond to a same refractive power value. The respective refractive power values for the curves are incremented by 0.25 δ between neighbouring curves, and are indicated on some of these curves.

FIG. 10b shows a resulting astigmatism map. The axes of these maps are similar to those of the refractive power maps and the isometric curves indicated on these maps connect gaze directions which correspond to a same resulting astigmatism value.

On each of these maps, a specific point FC is considered. It is positioned at 4 mm above the prism reference point PRP which is located at the middle of the micro-markings.

From FIGS. 10a-10c, one determines the features of the lens which match the optical specification described above, namely four optical portions for enhanced vision of four different screen types.

A Near Vision Zone Dedicated to Tablet Screen

A first optical portion OP1 having a substantially constant optical power P1, for example an optical power variation smaller than 0.12 δ over 6° on the a-axis along the channel line; the reference point RP corresponds to a lowering gaze angle equal to 25° and a screen distance of 33 cm.

An Ultra Near Vision Zone Dedicated to Smart Phone Screen:

SADD=0.125 δ.

OP2 corresponds to an average lowering gaze angle equal strictly lower than 25° and a screen distance, for example of a smart phone, strictly lower than 33 cm.

This zone is positioned below the near vision zone.

Along the channel line the optical power reaches the SADD value 48° below the fitting cross.

An Intermediate Vision Zone Dedicated to Computer Screen:

DDG1=−0.8 δ, in the case of a prescribed addition equal to 2.00 δ.

A third optical portion OP3 having a substantially constant optical power P3, for example an optical power variation smaller than 0.12 δ over 6° on the a-axis along the channel line; OP3 corresponds to a mean lowering gaze angle of 4° and a screen distance, for example of a computer screen, around 63 cm.

A Far-Intermediate Vision Zone Dedicated to TV Screen:

DDG2=−1.9 δ, in the case of a prescribed addition equal to 2.00 δ.

A fourth optical portion OP4 having a substantially constant optical power P4, for example optical power variation smaller than 0.12 δ in upper part of the lens; OP4 corresponds to an average lowering gaze angle lower than −20° and a screen distance, for example of a TV screen, equal to 220 cm. The angle corresponds to the upper part of the lens: a negative value of lowering angle corresponds indeed to an elevation angle direction.

Alternatively, the method further comprises a postural data determining step during which postural data of said wearer is determined.

Then, during the ophthalmic lens determining step S4, one may customize or personalize a predefined lens design from measured postural data.

On the FIGS. 11 and 12 one shows an embodiment of the lens according to the invention, under the wearing conditions, obtained via a method for determining an ophthalmic lens taking into accounting a measured screen distance for the computer screen.

FIG. 11 shows the lens design obtained starting from the lens design shown on FIG. 10a-10c taking into account a screen distance measure equal to 50 cm. This value of screen distance is slightly different from the value of screen distance considered for the standard lens design, namely 63 cm.

FIG. 12 shows the lens design obtained starting from the lens design shown on FIG. 10a-10c taking into account a screen distance measure equal to 80 cm. This value of screen distance is slightly different from the value of screen distance considered for the standard lens design, namely 63 cm.

One illustrates a situation where only the optical portion OP3 in intermediate vision dedicated to the computer is personalized. In particular one chooses to customize the distance to the computer screen. The example described here is not a limiting example; it is needless to say that any parameter used for positioning any optical portion of the lens, such as the lowering gaze angle and screen distance, may allow customizing or personalizing a standard lens design when an adapted parameter measure is available.

The invention has been described above with the aid of embodiments without limitation of the general inventive concept as defined in the claims.

Many modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. An ophthalmic lens intended for correcting a wearer's eye vision in compliance with a desired value of optical power and/or a desired value of astigmatism in given wearing conditions related to an electronic display observance, the ophthalmic lens comprising:
- a first optical portion having in the given wearing conditions a substantially constant optical power P1; the first optical portion being located in a lower part of a lens when the lens is placed in the given wearing conditions, the first optical portion being delimited by a first contour;
- a second optical portion having in the given wearing conditions a substantially constant optical power P2 with SADD=P2−P1>0; the second optical portion being located in the lower part of the lens at a lower position than the first optical portion, the second optical portion being delimited by a second contour;
- a reference point located within the first optical portion where a measure of optical power equals the desired value of optical power; and
- a channel line passing by the reference point, the channel line crossing an upper part of the first contour in a first point and a lower part of the first contour in a second point, the channel line crossing an upper part of the second contour in a third point, wherein the absolute difference between the optical power on any point of the first optical portion and the optical power at the reference point is smaller than 0.06 Diopter, wherein the absolute difference between the optical power on any point of the second optical portion and the optical power at the third point is smaller than 0.12 Diopter, wherein the first and second optical portions extend at least over 3 mm along the channel line, and at least over 3 mm along a direction substantially perpendicular to the channel line, wherein the power gradient along the channel line between any pair of points located on the channel line between the second point and the third point is positive, and wherein the first optical portion is determined such that when wearer's gaze is directed to a point of the first optical portion the wearer looks at a first electronic screen, disposed at a first distance of the wearer in a first near vision situation, and the second optical portion is determined such that when wearer's gaze is directed to a point of the second optical portion the wearer looks at a second electronic screen disposed at a second distance of the wearer smaller than the first distance and in a second near vision situation.

2. The ophthalmic lens according to claim 1, further comprising a third optical portion having a substantially constant optical power P3 in the given wearing conditions, with DDG1=P3−P1<0; the third optical portion being located above the first optical portion, the third optical portion being delimited by a third contour, the channel line crossing a lower part of the third contour in a fourth point;

wherein the absolute difference between the optical power on any point of the third optical portion and the optical power at the fourth point is smaller than 0.12 Diopter;

wherein the third optical portion extends at least over 3 mm along the channel line and at least over 3 mm along a direction substantially perpendicular to the channel line;

wherein the power gradient along the channel line between any pair of points located on the channel line between the fourth point and the first point is positive.

3. The ophthalmic lens according to claim 2, wherein the third optical portion is determined such that when wearer's gaze is directed to a point of the third optical portion the wearer looks at a third electronic screen disposed at a third distance of the wearer in a third near vision situation where the third distance is greater than the first distance.

4. The ophthalmic lens according to claim 2, further comprising a fourth optical portion having a substantially constant optical power P4 in the given wearing conditions with DDG2=P4−P1<0; more than 50% of the surface of the fourth optical portion being located within an upper part of the lens and located above the third optical portion, the fourth optical portion being delimited by a fourth contour, the channel line crossing a lower part of the fourth contour in a fifth point:

wherein the absolute difference between the optical power on any point of the fourth optical portion and the optical power at the fifth point is smaller than 0.12 Diopter;

wherein the fourth optical portion extends at least over 3 mm along the channel line and at least over 3 mm along a direction substantially perpendicular to the channel line;

wherein the power gradient along the channel line between any pair of points located on the channel line between the fifth point and the first point is positive.

5. The ophthalmic lens according to claim 4, wherein the fourth optical portion is determined such that when wearer's gaze is directed to a point of the fourth optical portion the wearer looks at a fourth electronic screen disposed at a fourth distance of the wearer in a fourth near vision situation where the fourth distance is greater than the third distance.

6. The ophthalmic lens according to claim 4, wherein
the reference point is positioned such that the gaze direction lowering angle from a fitting cross to the reference point is between 16° and 26°;
the first optical portion is determined such that the gaze direction lowering angle from the fitting cross to the first point is greater or equal to 12° and the gaze direction lowering angle from the fitting cross to the second point is less than or equal to 27°;
the second optical portion is determined such that the gaze direction lowering angle from the fitting cross to the third point is strictly greater than 27°;

$$0.125 \text{ Diopter} \leq SADD \leq 0.75 \text{ Diopter}.$$

7. The ophthalmic lens according to claim 6, wherein the fourth optical portion is positioned such that the gaze direction lowering angle from the fitting cross to the fourth point is less than or equal to 2° and $0.25 \leq |DDG2| \leq 2.5$ Diopter.

8. The ophthalmic lens according to claim 2, wherein
the reference point is positioned such that the gaze direction lowering angle from a fitting cross to the reference point is between 16° and 26°;
the first optical portion is determined such that the gaze direction lowering angle from the fitting cross to the first point is greater or equal to 12° and the gaze direction lowering angle from the fitting cross to the second point is less than or equal to 27°;
the second optical portion is determined such that the gaze direction lowering angle from the fitting cross to the third point is strictly greater than 27°;

$$0.125 \text{ Diopter} \leq SADD \leq 0.75 \text{ Diopter}.$$

9. The ophthalmic lens according to claim 8, wherein the third optical portion is positioned such that the gaze direction lowering angle from the fitting cross to a fourth point is less than or equal to 8° and $0.125 \leq |DDG1| \leq 2.5$ Diopter.

10. The ophthalmic lens according to claim 9, wherein the second optical portion is determined such that the gaze direction lowering angle from the fitting cross to the third point is strictly greater than 27° and SADD≤0.4 Diopter.

11. The ophthalmic lens according to claim 9, wherein the second optical portion is determined such that the gaze direction lowering angle from the fitting cross to the third point is strictly greater than 27° and SADD≤0.25 Diopter.

12. The ophthalmic lens according to claim 8, wherein the second optical portion is determined such that the gaze direction lowering angle from the fitting cross to the third point is strictly greater than 27° and SADD≤0.6 Diopter.

13. A computer implemented method for determining an ophthalmic lens for a wearer adapted for providing to the wearer a vision when looking at electronic displays, the method comprising:
a wearer near vision electronic display use determining step during which at least an electronic display the wearer intends to use in a near vision situation is determined;

a wearer intermediate vision electronic display use determining step during which at least an electronic display the wearer intends to use in an intermediate vision situation is determined;

a usage priority rank determining step during which an usage priority rank between the near vision electronic display during the wearer near vision electronic display use determining and the intermediate vision electronic display use determined during the wearer intermediate vision electronic display use determining step is determined; and an ophthalmic lens determining step during which an ophthalmic lens is determined from the at least one near vision electronic display or the at least one intermediate vision electronic display and the usage priority rank, wherein the ophthalmic lens determining step further comprises selecting a lens design for providing a lens to the wearer among a set of predefined lens designs.

14. The method according to claim 13, further comprising a postural data determining step during which postural data of the wearer is determined when the wearer is looking at one near vision electronic display determined during the wearer near vision electronic display use determining step or the at least one intermediate vision electronic display determined during the wearer intermediate vision electronic display use determining step wherein the ophthalmic lens determining further takes into account the measured postural data.

15. A computer implemented method, for determining an optical design of an ophthalmic lens adapted to a wearer, the method comprising:

a wearer data providing step, during which wearer data comprising at least an indication of a wearer's prescription are provided;

a first optical power determining step, during which a first optical power P1 relative to a first viewing distance is determined based on the wearer data, the first viewing distance being between 20 cm and 400 cm;

a second optical power determining step, during which a second optical power P2 relative to a second viewing distance is determined based on the wearer data, the second viewing distance being between 20 cm and 400 cm, the second viewing distance being smaller than the first viewing distance, and the second optical power P2 being strictly greater than the first optical power P1; and an optical design determining step, during which a first and second optical portions are determined;

the first optical portion being located in a lower part of the ophthalmic lens, the first optical portion being delimited by a first contour, the first optical portion having a first substantially constant optical power such that the absolute difference between the optical power on any point of the first optical portion and the determined first optical power P1 is smaller than 0.06 Diopter;

the second optical portion being located in the lower part of the ophthalmic lens at a lower position than the first optical portion, the second optical portion being delimited by a second contour, the second optical portion having a second substantially constant optical power such that the absolute difference between the optical power on any point of the second optical portion and the determined second optical power P2 is smaller than 0.12 Diopter, wherein a channel line passing by a point of the first optical portion having the determined first optical power P1, the channel line crossing a lower part of the first contour in a first point and an upper part of the second contour in a second point, the power gradient along the channel line between any pair of points located on the channel line between the first point and the second point being positive, wherein the first and second optical portions extending at least over 3 mm along the channel line, and at least over 3 mm along a direction substantially perpendicular to the channel line, and wherein the first optical portion is determined such that when wearer's gaze is directed to a point of the first optical portion the wearer looks at a first electronic screen, disposed at a first distance of the wearer in a first near vision situation, and the second optical portion is determined such that when wearer's gaze is directed to a point of the second optical portion the wearer looks at a second electronic screen disposed at a second distance of the wearer smaller than the first distance and in a second near vision situation.

16. The method according to claim 15, further comprising:

a third optical power determining step, during which a third optical power P3 relative to a third viewing distance is determined based on the wearer data, the third viewing distance being between 20 cm and 400 cm, the third viewing distance being greater than the first viewing distance, and the third optical power P3 being strictly smaller than the first optical power P1;

wherein during the optical design determining step, a third optical portion is determined, the third optical portion being located above the first optical portion, the third optical portion being delimited by a third contour;

the channel line crossing a lower part of the third contour in a third point and an upper part of the first contour in a fourth point;

the third optical portion having a substantially constant optical power such that the absolute difference between the optical power on any point of the third optical portion and the optical power at the third point is smaller than 0.12 Diopter;

wherein the power gradient along the channel line between any pair of points located on the channel line between the third point and the first point is positive, and wherein the third optical portion extending at least over 3 mm along the channel line, and at least over 3 mm along a direction substantially perpendicular to the channel line.

17. The method according to claim 16, further comprising:

a fourth optical power determining step, during which a fourth optical power P4 relative to a fourth viewing distance is determined based on the wearer data, the fourth viewing distance being between 20 cm and 400 cm, the fourth viewing distance being greater than the third viewing distance, and the fourth optical power P4 being strictly smaller than the first optical power P1;

wherein during the optical design determining, a fourth optical portion is determined;

more than 50% of the surface of the fourth optical portion is located within the upper part of the ophthalmic lens and located above the third optical portion;

the channel line crossing a lower part of the fourth contour in a fifth point;

the fourth optical portion having a substantially constant optical power such that the absolute difference between the optical power on any point of the fourth optical portion and the optical power at the fifth point is smaller than 0.12 Diopter;

wherein the power gradient along the channel line between any pair of points located on the channel line between the fifth point and the first point is positive; and wherein the fourth optical portion extending at least over 3 mm along the channel line, and at least over 3 mm along a direction substantially perpendicular to the channel line.

\* \* \* \* \*